United States Patent
Wu et al.

(10) Patent No.: US 8,661,134 B2
(45) Date of Patent: Feb. 25, 2014

(54) METHOD AND APPARATUS FOR OBTAINING AND REPORTING INSTANCE LABEL INFORMATION AND SYSTEM FOR PROCESSING INSTANCE LABEL INFORMATION

(75) Inventors: Huangwei Wu, Shenzhen (CN); Qinliang Zhang, Shenzhen (CN); Ping Fang, Shenzhen (CN); Yu Zhu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 186 days.

(21) Appl. No.: 13/161,915

(22) Filed: Jun. 16, 2011

(65) Prior Publication Data

US 2011/0246650 A1    Oct. 6, 2011

Related U.S. Application Data

(63) Continuation of application No. PCT/CN2009/075614, filed on Dec. 16, 2009.

(30) Foreign Application Priority Data

Dec. 16, 2008  (CN) .......................... 2008 1 0239767

(51) Int. Cl.
  *G06F 15/173* (2006.01)
(52) U.S. Cl.
  USPC .......................... 709/226; 709/236; 709/238
(58) Field of Classification Search
  USPC ......................................... 709/226, 236, 238
  See application file for complete search history.

(56) References Cited

U.S. PATENT DOCUMENTS

| 5,634,133 A * | 5/1997 | Kelley ........................ 715/209 |
| 2003/0024975 A1* | 2/2003 | Rajasekharan ............... 235/375 |

(Continued)

FOREIGN PATENT DOCUMENTS

| CN | 1455521 A | 11/2003 |
| CN | 101051903 A | 10/2007 |

(Continued)

OTHER PUBLICATIONS

First Chinese Office Action (partial translation) related to Chinese Application No. 200810239767.4; mailed May 19, 2011; (11 pgs.).

(Continued)

*Primary Examiner* — Phuoc Nguyen
(74) *Attorney, Agent, or Firm* — Conley Rose, P.C.; Grant Rodolph; Nicholas K. Beaulieu

(57) ABSTRACT

The present invention relates to the field of communication technologies, and discloses a method and an apparatus for obtaining and reporting instance label information and a system for processing instance label information. The method includes the following steps: a managing device sends a SearchLabel Request, where the Request carries information of an index label and the index label is used by the managing device for citing an object instance; the managing device receives a SearchLabel Response, where the Response carries information of an instance label corresponding to the index label information and the instance label is used by a managed device for citing the object instance. According to the present invention, the managing device calls the SearchLabel RPC method to search the managed device for the mapping relationships between index labels and instance labels, so that the managing device can obtain information of the mapping relationships of index labels on the managed device, thus improving the success ratio of configuration.

33 Claims, 6 Drawing Sheets

(56) References Cited

U.S. PATENT DOCUMENTS

2004/0015467 A1* 1/2004 Fano ............................ 707/1
2008/0133752 A1 6/2008 Liekens et al.

FOREIGN PATENT DOCUMENTS

| | | |
|---|---|---|
| CN | 101098247 A | 1/2008 |
| CN | 101127630 A | 2/2008 |
| CN | 101183967 A | 5/2008 |
| CN | 101184016 A | 5/2008 |
| CN | 101197719 A | 6/2008 |
| EP | 2068496 A1 | 6/2009 |
| WO | WO 2008/011019 A1 | 1/2008 |
| WO | WO 2010/069245 A1 | 6/2010 |

OTHER PUBLICATIONS

Written Opinion of the International Searching Authority related to Int'l Patent Application No. PCT/CN2009/075614; filed on Dec. 16, 2009; mailed on Mar. 25, 2010 (7 pgs.).

International Search Report related to Int'l Patent Application No. PCT/CN2009/075614; mailed on Mar. 25, 2010 (4 pgs.).

Rejection Decision dated (mailed) Nov. 14, 2011 in related Chinese Application No. 200810239767.4, Huawei Technologies LTD.

* cited by examiner

METHOD AND APPARATUS FOR OBTAINING AND REPORTING INSTANCE LABEL INFORMATION AND SYSTEM FOR PROCESSING INSTANCE LABEL INFORMATION

CROSS-REFERENCE TO RELATED APPLICATIONS

This application is a continuation of International Application No. PCT/CN2009/075614, filed on Dec. 16, 2009, which claims priority to Chinese Patent Application No. 200810239767.4, filed on Dec. 16, 2008, both of which are hereby incorporated by reference in their entireties.

FIELD OF THE INVENTION

The present invention relates to the field of communication technologies, and in particular, to a method and an apparatus for obtaining and reporting instance label information and a system for processing instance label information.

BACKGROUND OF THE INVENTION

As a broadband access technology, the digital subscriber line (DSL) has been widely applied. Based on various applications of the broadband access technology, for example, voice over IP (VoIP) and IP television (IPTV), various IP-based terminal devices are required. Those terminal devices are IP application terminals, known as customer premises equipments (CPEs) in the industry. An auto-configuration server (ACS) performs remote automatic configuration on each CPE and provides corresponding management functions.

In the current device management and automatic configuration framework, the CPE serves as a client and is a managed device; the ACS serves as a server and is a managing device. Both the CPE and the ACS provide some methods for each other to call. To call a method of a remote device is to send a specific message to the device and wait for the result returned by the device after the device responds to the message. Generally the ACS uses various remote procedure call (RPC) methods to configure CPE related parameters (nodes). A parameter (node) on the CPE can be uniquely identified by a path of the parameter (node), where the path is from the root to the parameter (node). A parameter (node) is an object. An object may further include one or multiple object instances, and the corresponding instance label (InstanceNumber) can be allocated by the CPE.

In the prior art, because the instance label of the same object instance varies on different CPEs, index labels can be used on the ACS to differentiate various object instances on the CPEs, and the corresponding messages of various object instances sent from the ACS to the CPEs carry corresponding index labels. In this way, the CPEs can maintain the mapping relationships between instance labels and index labels of object instances. When the ACS intends to manage the same object instance on multiple CPEs, because the same object instance uses the same index label and the CPEs store the mapping relationships between index labels and instance labels, the ACS can manage the same object instance on multiple CPEs uniformly by using the index label.

The method for managing object instances in the prior art has the following defects: Though a CPE stores the mapping relationships between index labels and instance labels, the ACS cannot determine whether a specific index label corresponds to an instance label stored on the CPE, and cannot determine the mapping relationships of which index labels and instance labels are stored on the CPE. When the CPE does not store the mapping relationship between a specific index label and an instance label, the ACS fails to perform batch configuration on the object instance corresponding to the index label on the CPE; when a non-ACS entity (a user or a third-party entity) deletes the object instance corresponding to the index label, the ACS cannot know the information, and the ACS fails to perform batch configuration on the deleted object instance corresponding to the index label on the CPE, thus reducing the success ratio of configuration.

SUMMARY OF THE INVENTION

Embodiments of the present invention provide a method and an apparatus for obtaining and reporting instance label information and a system for processing instance label information so that a managing device can obtain instance label information corresponding to index label information on a managed device, thus improving the success ratio of configuration.

An embodiment of the present invention provides a method for obtaining instance label information, including:

sending, by a managing device, a SearchLabel Request, where the Request carries information of an index label and the index label is used by the managing device for citing an object instance; and receiving, by the managing device, a SearchLabel Response, where the Response carries information of an instance label corresponding to the index label information and the instance label is used by a managed device for citing the object instance.

An embodiment of the present invention provides a method for reporting instance label information, including:

receiving, by a managed device, a SearchLabel Request, where the Request carries information of an index label and the index label is used by a managing device for citing an object instance; and sending, by the managed device, a SearchLabel Response, where the Response carries information of an instance label corresponding to the index label information and the instance label is used by the managed device for citing the object instance.

An embodiment of the present invention provides a method for reporting index label information, including: sending, by a managed device, a LabelDeletion Notification, where the Notification carries an index label corresponding to a deleted object instance and the index label is used by a managing device for citing an object instance.

An embodiment of the present invention provides a managing device, including:

a sending module, configured to send a SearchLabel Request, where the Request carries information of an index label and the index label is used by the managing device for citing an object instance; and an obtaining module, configured to receive a SearchLabel Response, where the Response carries information of an instance label corresponding to the index label information and the instance label is used by a managed device for citing the object instance.

An embodiment of the present invention provides a managed device, including:

a receiving module, configured to receive a SearchLabel Request, where the Request carries information of an index label and the index label is used by a managing device for citing an object instance; and a first reporting module, configured to send a SearchLabel Response, where the Response carries information of an instance label corresponding to the index label information and the instance label is used by the managed device for citing the object instance.

An embodiment of the present invention also provides another managed device, including: a second reporting module, configured to send a LabelDeletion Notification, where the Notification carries an index label corresponding to a deleted object instance and the index label is used by a managing device for citing an object instance.

An embodiment of the present invention provides a system for processing instance label information, including:

a first managing device, configured to: send a SearchLabel Request to a first managed device, where the Request carries information of an index label and the index label is used by the first managed device for citing an object instance, and receive a SearchLabel Response, where the Response carries information of an instance label corresponding to the index label information and the instance label is used by the first managed device for citing the object instance; and the first managed device, configured to receive the SearchLabel Request sent by the first managing device and send the SearchLabel Response to the first managing device.

An embodiment of the present invention provides a system for processing index label information, including:

a second managed device, configured to send a LabelDeletion Notification to a second managing device, where the Notification carries an index label corresponding to a deleted object instance and the index label is used by the second managing device for citing an object instance; and the second managing device, configured to receive the LabelDeletion Notification sent by the second managed device.

As seen from the preceding technical solution, in embodiments of the present invention, the managing device calls a SearchLabel RPC method to search the managed device for the mapping relationships between index labels and instance labels; the managed device returns information of an instance label corresponding to the index label information to the managing device according to the index label information carried in the received SearchLabel RPC method, so that the managing device can obtain information of the mapping relationship of the index label on the managed device, thus improving the success ratio of configuration. When a non-managing network entity deletes an object instance on the managed device, the managed device notifies the managing device that the corresponding index label is deleted, so that the managing device can obtain information of the mapping relationship of the index label on the managed device in the same way, thus improving the success ratio of configuration.

BRIEF DESCRIPTION OF THE DRAWINGS

The accompanying drawings are intended for better understanding of the embodiments of the present invention and constitute a part of this application rather than a limitation on the present invention. In the drawings.

DETAILED DESCRIPTION OF THE EMBODIMENTS

To make the objectives, technical solution and merits of the present invention clearer, the following describes the present invention in detail with reference to the accompanying embodiments and accompanying drawings. The exemplary embodiments of the present invention and the description thereof are illustrative in nature, and shall not be construed as limitations on the present invention.

Figure 1:
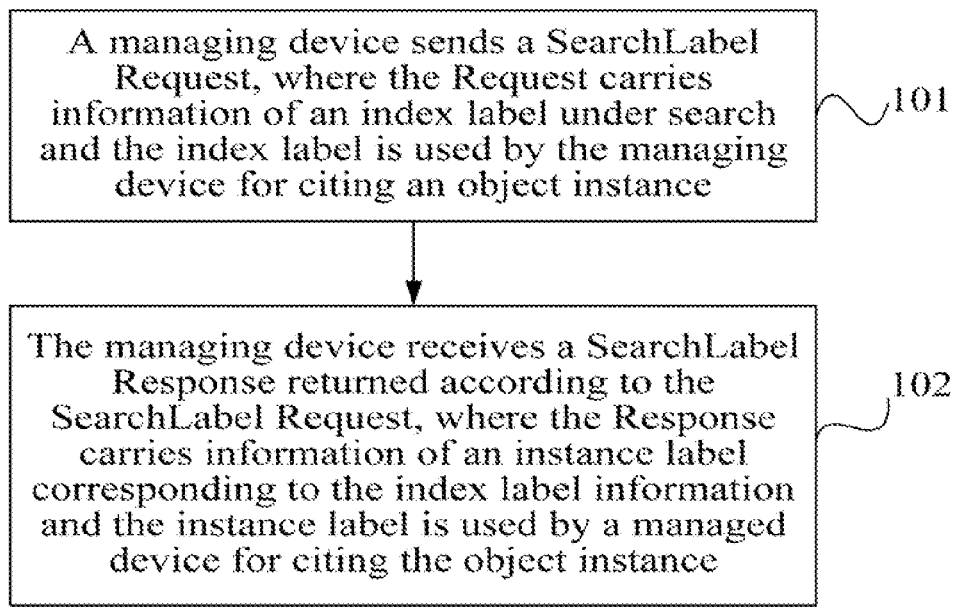
FIG. 1 is a schematic flowchart of a method for obtaining instance label information according to a first embodiment of the present invention.

FIG. 1 is a schematic flowchart of a method for obtaining instance label information according to the first embodiment of the present invention. As shown in FIG. 1, the method may include the following steps:

Step 101: A managing device sends a SearchLabel Request, where the Request carries information of an index label under search and the index label is used by the managing device for citing an object instance.

Step 102: The managing device receives a SearchLabel Response returned according to the SearchLabel Request, where the Response carries information of an instance label corresponding to the index label information and the instance label is used by a managed device for citing the object instance.

The index label information may be a LabelName parameter, and the value of the parameter may be set to the name of a specified index label, for example, "IPTV", and may also be set to a path of an object instance identified by the index label, for example, "InternetGatewayDevice.Services.IPTV". In this case, the instance label information corresponding to the index label information is the instance label information corresponding to the specified index label. The value of the LabelName parameter may be set to null, and the instance label information corresponding to the index label information is the instance label information corresponding to all the index labels stored by the managed device. The value of the LabelName parameter may also be set to a partial path, and the instance label information corresponding to the index label information is the instance label information corresponding to a part of the index labels stored by the managed device. Further, the instance label information may be an instance label, for example, "1", or may be a path of an object instance identified by an instance label, for example, "InternetGatewayDevice.Services.1".

In this embodiment, the managing device can call the SearchLabel RPC method to search the managed device for the mapping relationships between index labels and instance labels, so that the managing device can obtain information of the mapping relationships between index labels and instance labels on the managed device, thus improving the success ratio of configuration.

Figure 2:
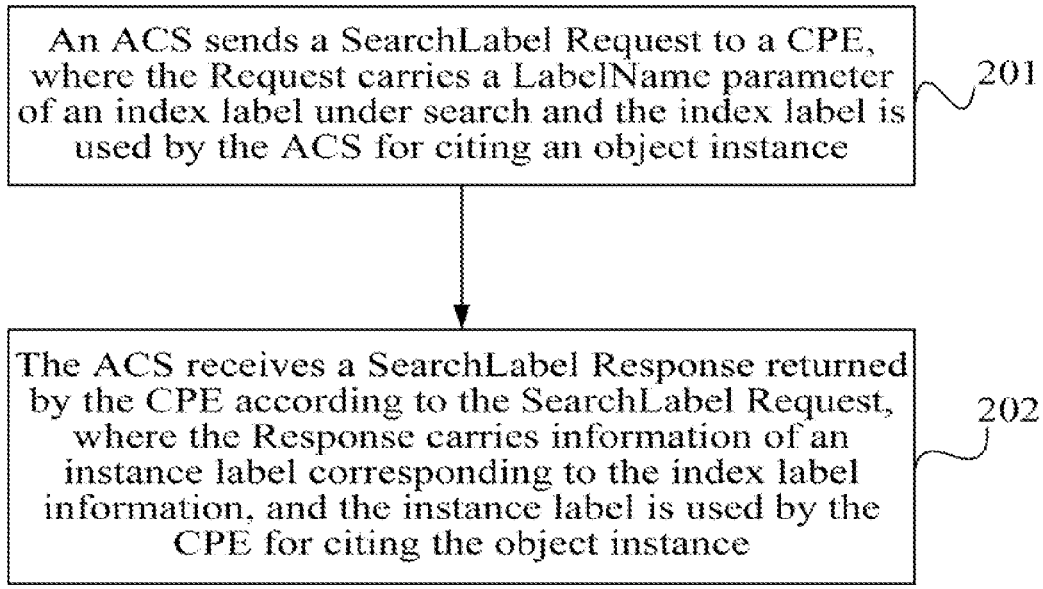
FIG. 2 is a schematic flowchart of a method for obtaining instance label information according to a second embodiment of the present invention.

FIG. 2 is a schematic flowchart of a method for obtaining instance label information according to the second embodiment of the present invention. Table 1 shows the mapping relationships between index labels and instance labels stored on the CPE in this embodiment.

TABLE 1

Mapping relationships between index labels and instance labels

| Index Label | Instance Label (Instance Number) |
|---|---|
| IPTV | 1 |
| VoIP | 5 |
| ... | ... |

As shown in Table 1, the mapping relationships between index labels and instance labels stored on the CPE are simple mapping relationships between index labels of the string type and instance labels of the integer type. Low requirements are imposed on the CPE. Only the index labels corresponding to the instance labels need to be stored on the CPE. There is no need to store the detailed paths.

As shown in FIG. 2, the method for obtaining instance label information according to the second embodiment of the present invention may include the following steps:

Step 201: An ACS sends a SearchLabel Request to a CPE, where the Request carries a LabelName parameter of an index label under search and the index label is used by the ACS for citing an object instance.

Related parameters of the SearchLabel Request may be as shown in Table 2.

TABLE 2

Related parameters of the SearchLabel Request example 1

| Parameter | Type | Description |
|---|---|---|
| Label Name | (string(256)) | Indicates the name of the index label that the ACS intends to search for. The value of this parameter may be represented in two equivalent forms, indicating whether the specific index label under search corresponds to an instance label on the CPE: <br> 1. Name of the index label, for example, "IPTV"; <br> 2. Path of an object instance identified by the index label, for example: <br> "InternetGatewayDevice.Services.IPTV". <br> Especially, when this parameter is set to a null string, it means searching for all mapping relationships between index labels and instance labels stored on the CPE. |

Step 202: The ACS receives a SearchLabel Response returned by the CPE according to the SearchLabel Request, where the Response carries information of an instance label corresponding to the index label information, and the instance label (instance number) is used by the CPE for citing the object instance.

Related parameters of the SearchLabel Response may be as shown in Table 3 and Table 4.

TABLE 3

Related parameters of the SearchLabel Response example 1

| Parameter | Type | Description |
| --- | --- | --- |
| IsLabelExist | boolean | Indicates whether the index label specified by the LabelName parameter in the SearchLabel Request exists: (1) When LabelName is set to a specific index label, 0 indicates the index label does not exist on the CPE; 1 indicates the index label exists on the CPE; (2) When LabelName is set to a null string, 0 indicates no information of the mapping relationships between index labels and instance labels exists on the CPE; 1 indicates information of at least one mapping relationship between an index label and an instance label is stored on the CPE. |
| LabelInstance List | Structure array of object instances identified by index labels (LabelInstanceStruct [ ]) | Indicates a list of index labels and instance labels and is a LabelInstanceStruct structure array. Each LabelInstanceStruct structure stores information of a mapping relationship between an index label and an instance label; related parameters of the LabelInstanceStruct structure array may be as shown in Table 4. (1) When LabelName is set to a specific index label, If IsLabelExist is set to "0", that is, no instance label on the CPE corresponds to the index label, the CPE returns a null value; If IsLabelExist is set to "1", that is, an instance label on the CPE corresponds to the index label, the CPE returns an element of the LabelInstanceStruct structure array; for example, if the ACS intends to search for the "IPTV" index label, the returned value of LabelInstanceList is "(IPTV, 1)"; (2) When LabelName is set to a null string, If IsLabelExist is set to "0", the returned value of LabelInstanceList is null; If IsLabelExist is set to "1", the returned LabelInstanceStruct structure array includes information of all mapping relationships between index labels and instance labels, for example, "(IPTV, 1), (VoIP, 5) . . . ". |

TABLE 4

Related parameters of the LabelInstanceStruct structure array example 1

| Parameter | Type | Description |
| --- | --- | --- |
| LabelName | (string(256)) | Indicates the name of an index label, for example, "IPTV". |
| InstanceNumber | (UnsignedInt[1:]) | Indicates the instance label corresponding to the index label specified by the LabelName parameter. For example, if LabelName is set to "IPTV", InstanceNumber is set to "1". |

In this embodiment, the ACS can use the SearchLabel RPC method defined above to find whether an instance label on the CPE corresponds to the specific index label. For example, when the ACS searches the CPE for an index label "IPTV", the ACS can call the SearchLabel RPC method, that is, send a SearchLabel Request to the CPE, where the LabelName parameter in the Request can be set to "IPTV", or set to "InternetGatewayDevice.Services.IPTV". When the CPE receives the SearchLabel Request from the ACS, the CPE searches the table of mapping relationships between index labels and instance labels stored by the CPE itself for an "IPTV" entry according to the LabelName parameter. If an "IPTV" entry exists, the CPE finds the instance label corresponding to the "IPTV" index label; for example, if the instance label corresponding to the "IPTV" index label is "1", the CPE sends a SearchLabel Response to the ACS, where the returned value of the IsLabelExist parameter is "1". Further, the specific mapping relationship may be returned, that is, the returned value of the LabelInstanceList parameter is "(IPTV, 1)". If no "IPTV" entry exists, the CPE sends a SearchLabel Response to the ACS, where the returned value of the IsLabelExist parameter is "0", and accordingly, the returned value of the LabelInstanceList parameter is null. After receiving the SearchLabel Response from the CPE, the ACS can know whether an instance label on the CPE corresponds to the specific "IPTV" index label, thus finishing searching the CPE for the specific index label.

Further, the ACS in this embodiment can use the SearchLabel RPC method defined above to search for all mapping relationships between index labels and instance labels stored on the CPE. For example, when the ACS intends to search for all mapping relationships between index labels and instance labels stored on the CPE, the ACS can call the SearchLabel RPC method, where the LabelName parameter in the Request can be set to null. When the CPE receives the SearchLabel Request from the ACS, the CPE searches the table of mapping relationships between index labels and instance labels stored by the CPE itself for the corresponding entries according to the LabelName parameter. If the corresponding entries exist, the CPE finds all index labels and the corresponding instance labels, for example, finds that the index label "IPTV" corresponds to the instance label "1", and that the index label "VoIP" corresponds to the instance label "5". The CPE sends a SearchLabel Response to the ACS, where the returned value of the IsLabelExist parameter is "1" and the returned value of the LabelInstanceList parameter is "(IPTV, 1), (VoIP, 5)". If no corresponding entry exists, the CPE sends a SearchLabel Response to the ACS, where the returned value of the IsLabelExist parameter is "0", and accordingly, the returned value of the LabelInstanceList parameter is null. After receiving the SearchLabel Response from the CPE, the ACS can know that the CPE has stored information of all mapping relationships between index labels and instance labels, thus finishing searching for all index labels on the CPE.

After the ACS obtains information of mapping relationships between index labels and instance labels on the CPE by using the method for obtaining label information in this embodiment, the ACS must specify a path in the input parameter of the corresponding RPC method when configuring the CPE. For example, if the ACS intends to configure related service parameters of the index label "IPTV", the ACS must specify the following path:

"InternetGatewayDevice.Services.IPTV . . . ".

After receiving the RPC command, the CPE can search the mapping relationship table to exactly map the above path to "InternetGatewayDevice.Services.1 . . . ", so that the ACS can correctly configure the corresponding object instance on the CPE, thus improving the success ratio of configuration.

In this embodiment, the ACS calls the SearchLabel RPC method to search the CPE for an instance label of the object instance corresponding to a specific index label, or to search for all mapping relationships between index labels and instance labels stored on the CPE, so that the ACS can obtain information of the mapping relationships of the index labels on the CPE, thus improving the success ratio of configuration.

Figure 3:
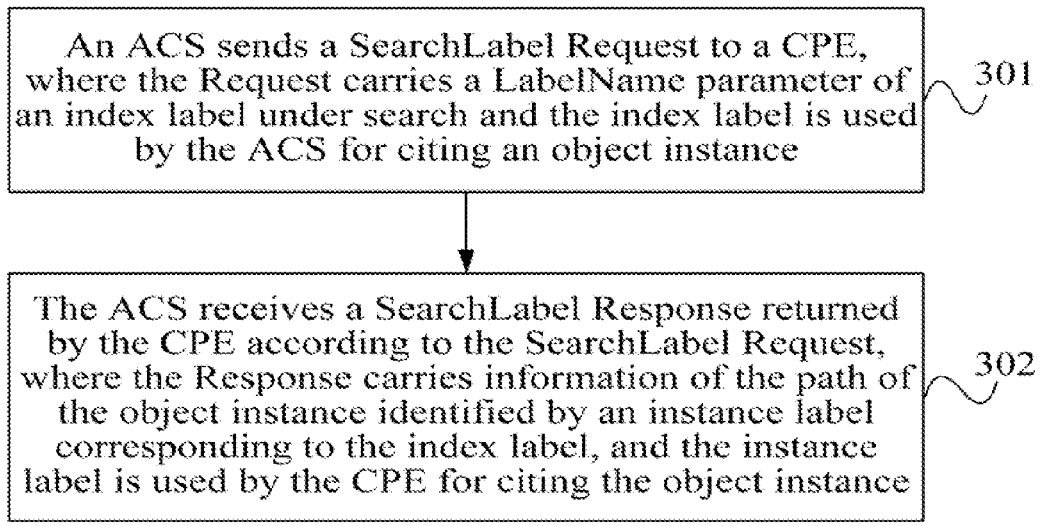
FIG. 3 is a schematic flowchart of a method for obtaining instance label information according to a third embodiment of the present invention.

FIG. 3 is a schematic flowchart of a method for obtaining instance label information according to the third embodiment of the present invention. In this embodiment, the mapping relationships between index labels and paths of object instances identified by instance labels stored on the CPE are as shown in Table 5. As shown in FIG. 3, the method in this embodiment may include the following steps:

Step 301: An ACS sends a SearchLabel Request to a CPE, where the Request carries a LabelName parameter of an index label under search and the index label is used by the ACS for citing an object instance.

Related parameters of the SearchLabel Request may be as shown in Table 6.

TABLE 6

Related parameters of the SearchLabel Request example 2

| Parameter | Type | Description |
|---|---|---|
| LabelName | (string(256)) | Indicates the name of the index label that the ACS intends to search for. The value of this parameter may be represented in three forms, where the first two forms are equivalent:<br>1. Name of the index label, indicating whether the specific index label under search corresponds to an instance label on the CPE, for example, "IPTV";<br>2. Path of an object instance identified by an index label (the complete path of the object instance), indicating whether the specific index label under search corresponds to an instance label on the CPE, for example, "InternetGatewayDevice.Services.IPTV";<br>3. Partial path (path from the root node to a node), indicating to search for all mapping relationships between index labels stored by the child object (node) specified by the path name and paths of object instances identified by instance labels, for example, "InternetGatewayDevice.Services."; the value of this parameter must end with ".".<br>Especially, when this parameter is set to a null string, it indicates to search for all mapping relationships between index labels and paths of object instances identified by instance labels on the CPE. |

Step 302: The ACS receives a SearchLabel Response returned by the CPE according to the SearchLabel Request, where the Response carries information of the path of the object instance identified by an instance label corresponding to the index label, and the instance label (instance number) is used by the CPE for citing the object instance.

Related parameters of the SearchLabel Response may be as shown in Table 7 and Table 8.

TABLE 7

Related parameters of the SearchLabel Response example 2

| Parameter | Type | Description |
| --- | --- | --- |
| IsLabelExist | boolean | Indicates whether the index label specified by the LabelName parameter in the SearchLabel Request exists: (1) When LabelName is set to a specific index label, 0 indicates that the index label does not exist on the CPE; 1 indicates that the index label exists on the CPE; (2) When LabelName is set to the name of a partial path, 0 indicates that the node specified by the LabelName parameter has no information of mapping relationships between index labels and paths of object instances identified by instance labels; 1 indicates that the node specified by the LabelName parameter has information of at least one mapping relationship between an index label and a path of an object instance identified by an instance label; (3) When LabelName is set to a null string, 0 indicates that the CPE has no information of mapping relationships between index labels and paths of object instances identified by instance labels; 1 indicates that the CPE has information of at least one mapping relationship between an index label and a path of an object instance identified by an instance label; |
| LabelInstance List | Structure array of object instances identified by index labels (LabelInstanceStruct [ ]) | Indicates a list of index labels and paths of object instances identified by instance labels, and is a LabelInstanceStruct structure array. Each LabelInstanceStruct structure stores information of a mapping relationship between an index label and a path of an object instance identified by an instance label; related parameters of the LabelInstanceStruct structure array may be as shown in Table 8. (I) When LabelName is set to a specific index label, If IsLabelExist is set to "0", that is, no path of an object instance identified by an instance label on the CPE corresponds to the index label, the CPE returns a null value; If IsLabelExist is set to "1", that is, a path of an object instance identified by an instance label on the CPE corresponds to the index label, the CPE returns an element of the LabelInstanceStruct structure array, for example, "(IPTV, InternetGatewayDevice.Services.1)". (2) When LabelName is set to a partial path, If IsLabelExist is set to "0", the CPE returns a null value; If IsLabelExist is set to "1", the CPE returns a part of elements of the LabelInstanceStruct structure array, namely, the mapping relationship under the node to be searched. For example, if the ACS intends to search for information of all mapping relationships under the InternetGatewayDevice.Services node, the returned value of the LabelInstanceList parameter is "(IPTV, InternetGatewayDevice.Services.1), (VoIP, InternetGatewayDevice.Services.5) . . . "; (3) When LabelName is set to a null string, If IsLabelExist is set to "0", the CPE returns a null value; If IsLabelExist is set to "1", the returned LabelInstanceStruct structure array includes information of all stored mapping relationships between index labels and paths of object instances identified by instance labels, for example, "(IPTV, InternetGatewayDevice.Services.1), (VoIP, InternetGatewayDevice.Services.5) . . . ". |

TABLE 8

Related parameters of the LabelInstanceStruct structure array example 2

| Parameter | Type | Description |
| --- | --- | --- |
| LabelName | (string(256)) | Indicates the name of an index label, for example, "IPTV". |
| InstanceNumber | (string(256)) | Indicates the path of an object instance identified by an instance label corresponding to the index label specified by the LabelName parameter; for example, if LabelName is set to "IPTV", the value of InstanceNumber is "InternetGatewayDevice.Services.1". |

In this embodiment, the ACS can use the SearchLabel RPC method defined above to find whether an instance label on the CPE corresponds to the specific index label. For example, when the ACS searches the CPE for an index label "IPTV", the ACS can call the SearchLabel RPC method, that is, send a SearchLabel Request to the CPE, where the LabelName parameter in the Request can be set to "IPTV", or set to "InternetGatewayDevice.Services.IPTV". When the CPE receives the SearchLabel Request from the ACS, the CPE searches the table of mapping relationships between index labels and paths of object instances identified by instance labels stored by the CPE itself for an "IPTV" entry according to the LabelName parameter. If an "IPTV" entry exists, the CPE finds the path of the object instance identified by the instance label corresponding to the "IPTV" index label; for example, if the instance label corresponding to the "IPTV" index label is "InternetGatewayDevice.Services.1", the CPE sends a SearchLabel Response to the ACS, where the returned value of the IsLabelExist parameter is "1". Further, the specific mapping relationship may be returned, that is, the returned value of the LabelInstanceList parameter is "(IPTV, InternetGatewayDevice.Services.1)". If no "IPTV" entry exists, the CPE sends a SearchLabel Response to the ACS, where the returned value of the IsLabelExist parameter is "0", and accordingly, the returned value of the LabelInstanceList parameter is null. After receiving the SearchLabel Response from the CPE, the ACS can know whether a path of an object instance identified by an instance label on the CPE corresponds to the specific "IPTV" index label, thus finishing searching the CPE for the specific index label.

Further, the ACS in this embodiment can use the SearchLabel RPC method defined above to search the CPE for information of a part of all stored mapping relationships between index labels and paths of object instances identified by instance labels under a node (including the root node). For example, when the ACS searches the CPE for all mapping relationships between index labels and paths of object instances identified by instance labels under the InternetGatewayDevice.Services node, the ACS can call the SearchLabel RPC method, where the LabelName parameter in the Request can be set to "InternetGatewayDevice.Services". When the CPE receives the SearchLabel Request from the ACS, the CPE searches the table of mapping relationships between index labels and paths of object instances identified by instance labels stored by the CPE itself for a corresponding entry under the InternetGatewayDevice.Services node according to the LabelName parameter. If the corresponding entry exists, the CPE finds all index labels and the corresponding paths of object instances identified by instance labels, for example, finds that the index label "IPTV" corresponds to the path "InternetGatewayDevice.Services.1" of the object instance identified by an instance label, and that the index label "VoIP" corresponds to the path "InternetGatewayDevice.Services.5" of the object instance identified by an instance label. The CPE sends a SearchLabel Response to the ACS, where the returned value of the IsLabelExist parameter is "1" and the returned value of the LabelInstanceList parameter is "(IPTV, InternetGatewayDevice.Services.1), (VoIP, InternetGatewayDevice.Services.5)". If no corresponding entry exists, the CPE sends a SearchLabel Response to the ACS, where the returned value of the IsLabelExist parameter is "0", and accordingly, the returned value of the LabelInstanceList parameter is null. After receiving the SearchLabel Response from the CPE, the ACS can know information of all mapping relationships between index labels and paths of object instances identified by instance labels under a node of the CPE, thus finishing searching the CPE for a part of index labels.

Further, for the root node InternetGatewayDevice, the LabelName parameter in the Request may be set to "InternetGatewayDevice.", or set to null. Therefore, the ACS knows that the CPE has stored information of all mapping relationships between index labels and paths of object instances identified by instance labels, thus finishing searching the CPE for all index labels.

After the ACS obtains information of mapping relationships between index labels and paths of object instances identified by instance labels on the CPE by using the method for obtaining label information in this embodiment, the ACS can specify a path in the input parameter of the corresponding RPC method during configuration. For example, if the ACS intends to configure related service parameters of the index label "IPTV", the ACS must specify the following path:

"InternetGatewayDevice.Services.IPTV . . . ".

After receiving the RPC command, the CPE can search the mapping relationship table to exactly map the above path to "InternetGatewayDevice.Services.1 . . . ", so that the ACS can correctly configure the corresponding object instance on the CPE, thus improving the success ratio of configuration.

Alternatively, in step 302 of this embodiment, the CPE can identify the specific instance label according to the found path of the object instance corresponding to the index label of the object instance. In this way, the SearchLabel Response returned to the ACS can carry only the instance label corresponding to the index label of the object instance without carrying the path of the object instance.

In this embodiment, the ACS calls the SearchLabel RPC method to search the CPE to find whether a path of an object instance identified by an instance label on the CPE corresponds to the specific index label, or to search the CPE for a part or all of the stored mapping relationships between index labels and paths of object instances identified by instance labels, so that the ACS can obtain information of the mapping relationships of the index labels on the CPE, thus improving the success ratio of configuration.

Figure 4:
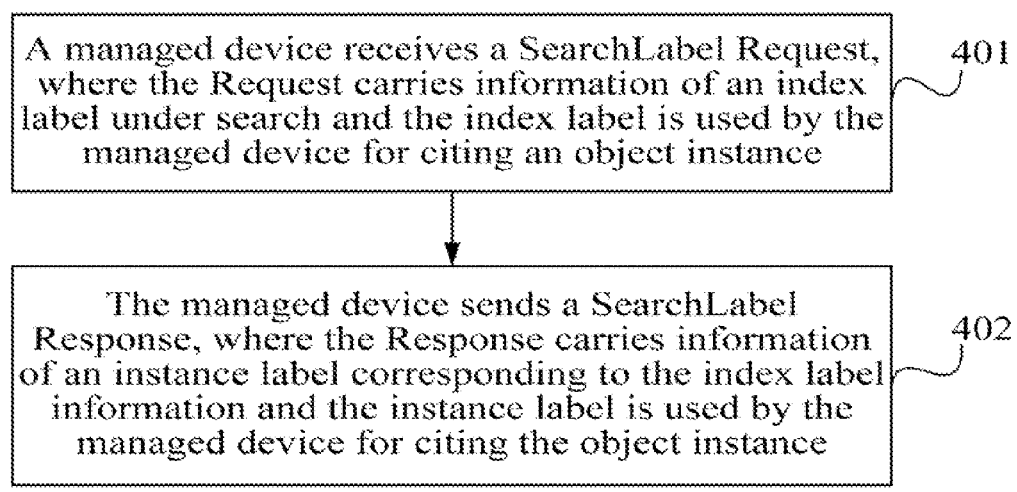
FIG. 4 is a schematic flowchart of a method for reporting instance label information according to a fourth embodiment of the present invention.

FIG. 4 is a schematic flowchart of a method for reporting instance label information according to the fourth embodiment of the present invention. As shown in FIG. 4, the method may include the following steps:

Step 401: A managed device receives a SearchLabel Request, where the Request carries information of an index label under search and the index label is used by the managed device for citing an object instance.

Step 402: The managed device sends a SearchLabel Response, where the Response carries information of an instance label corresponding to the index label information and the instance label is used by the managed device for citing the object instance.

The index label information may be a LabelName parameter, and the value of the parameter may be set to the name of a specified index label, or set to a path of an object instance identified by the index label. In this case, the instance label information corresponding to the index label information is the instance label information corresponding to the specified index label. The value of the LabelName parameter may be set to null, and the instance label information corresponding to the index label information is the instance label information corresponding to all the index labels stored by the managed device. The value of the LabelName parameter may also be set to a partial path, and the instance label information corresponding to the index label information is the instance label information corresponding to a part of the index labels stored by the managed device. Further, the instance label information may be an instance label, for example, "1", or may be a path of an object instance identified by an instance label, for example, "InternetGatewayDevice.Services.1".

In this embodiment, the managed device pre-stores the mapping relationships between index labels and instance labels. When the managing device calls the SearchLabel RPC method to perform search, the managed device can find the corresponding instance labels according to the obtained index labels, and return information of the mapping relationships between index labels and instance labels to the managing device, thus improving the success ratio of configuration.

Figure 5:
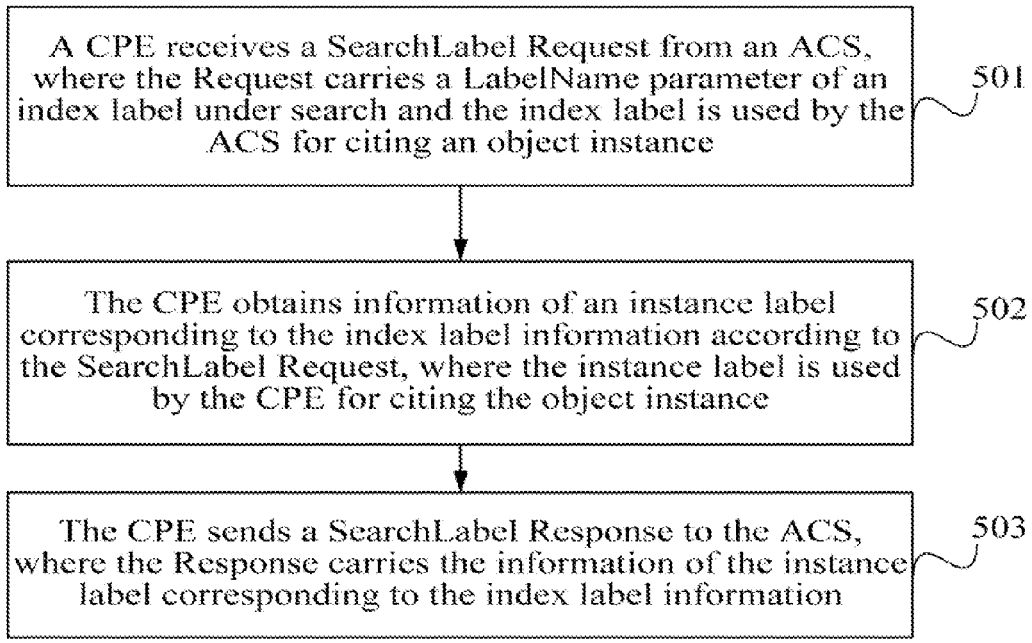
FIG. 5 is a schematic flowchart of a method for reporting instance label information according to a fifth embodiment of the present invention.

FIG. 5 is a schematic flowchart of a method for reporting instance label information according to the fifth embodiment of the present invention. In this embodiment, the CPE pre-stores the mapping relationships between index labels and instance labels as shown in Table 1. As shown in FIG. 5, the method in this embodiment may include the following steps:

Step 501: A CPE receives a SearchLabel Request from an ACS, where the Request carries a LabelName parameter of an index label under search and the index label is used by the ACS for citing an object instance.

Related parameters of the SearchLabel Request may be as shown in Table 2.

Step 502: The CPE obtains information of an instance label corresponding to the index label information according to the SearchLabel Request, where the instance label is used by the CPE for citing the object instance.

Step 503: The CPE sends a SearchLabel Response to the ACS, where the Response carries the information of the instance label corresponding to the index label information.

Related parameters of the SearchLabel Response may be as shown in Table 3 and Table 4.

In this embodiment, the CPE pre-stores the mapping relationships between index labels and instance labels. When the ACS calls the SearchLabel RPC method to perform search, the CPE can find the corresponding instance labels according to the obtained index labels, and return information of the mapping relationships between index labels and instance labels to the ACS, thus improving the success ratio of configuration.

Figure 6:
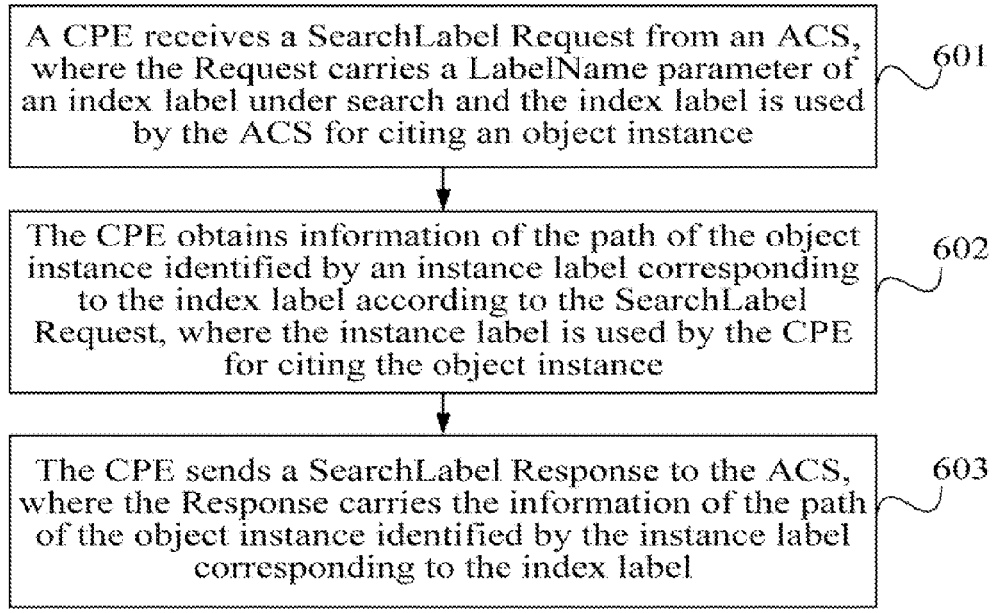
FIG. 6 is a schematic flowchart of a method for reporting instance label information according to a sixth embodiment of the present invention.

FIG. 6 is a schematic flowchart of a method for reporting instance label information according to the sixth embodiment of the present invention. In this embodiment, the CPE pre-stores the mapping relationships between index labels and paths of object instances identified by instance labels as shown in Table 5. As shown in FIG. 6, the method in this embodiment may include the following steps:

Step 601: A CPE receives a SearchLabel Request from an ACS, where the Request carries a LabelName parameter of an index label under search and the index label is used by the ACS for citing an object instance.

Related parameters of the SearchLabel Request may be as shown in Table 6.

Step 602: The CPE obtains information of the path of the object instance identified by an instance label corresponding to the index label according to the SearchLabel Request, where the instance label is used by the CPE for citing the object instance.

Step 603: The CPE sends a SearchLabel Response to the ACS, where the Response carries the information of the path of the object instance identified by the instance label corresponding to the index label.

Related parameters of the SearchLabel Response may be as shown in Table 7 and Table 8.

In this embodiment, the CPE pre-stores the mapping relationships between index labels and paths of object instances identified by instance labels. When the ACS calls the SearchLabel RPC method to perform search, the CPE can find the corresponding paths of object instances identified by instance labels according to the obtained index labels, and return information of the mapping relationships between index labels and paths of object instances identified by instance labels to the ACS, thus improving the success ratio of configuration.

Figure 7:
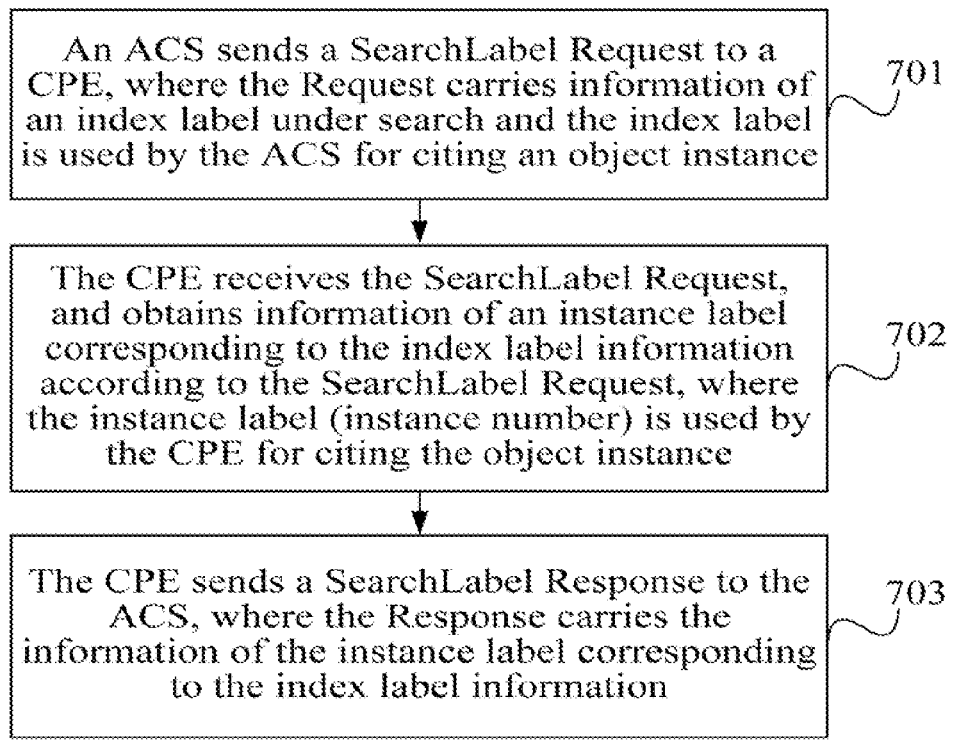
FIG. 7 is a schematic flowchart of a method for processing instance label information according to a seventh embodiment of the present invention.

FIG. 7 is a schematic flowchart of a method for processing instance label information according to the seventh embodiment of the present invention. As shown in FIG. 7, the method in this embodiment may include the following steps:

Step 701: An ACS sends a SearchLabel Request to a CPE, where the Request carries information of an index label under search and the index label is used by the ACS for citing an object instance.

Step 702: The CPE receives the SearchLabel Request, and obtains information of an instance label corresponding to the index label information according to the SearchLabel Request, where the instance label (instance number) is used by the CPE for citing the object instance.

Step 703: The CPE sends a SearchLabel Response to the ACS, where the Response carries the information of the instance label corresponding to the index label information.

Figure 8:
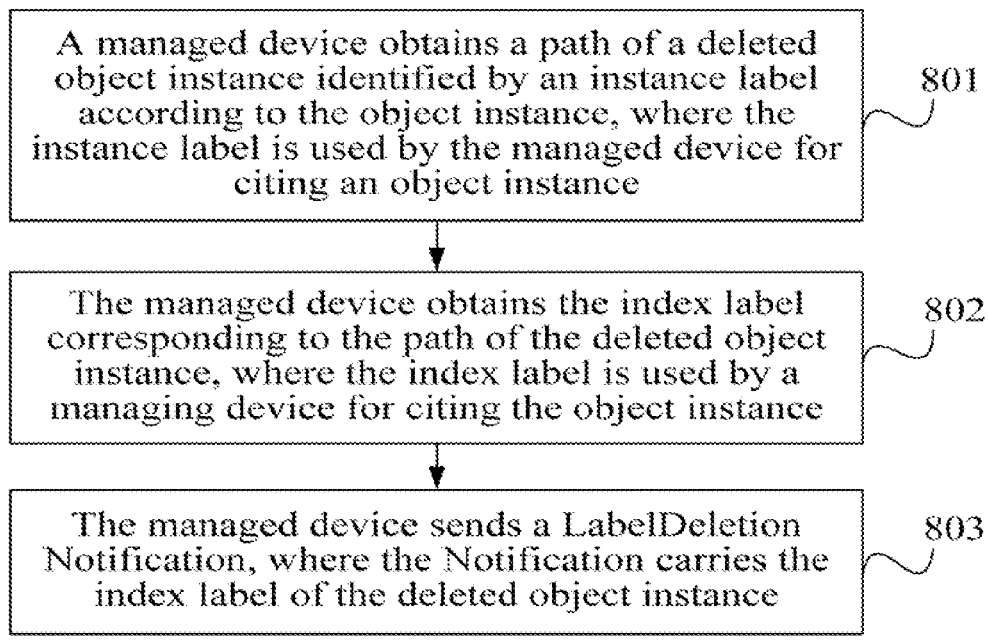
FIG. 8 is a schematic flowchart of a method for reporting index label information according to an eighth embodiment of the present invention.

In this embodiment, the ACS can call the SearchLabel RPC method to search the CPE for the mapping relationships between index labels and instance labels; the CPE can find the corresponding instance labels according to the obtained index labels, and return information of the mapping relationships between the index labels and the instance labels, so that the ACS can obtain information of the mapping relationships of the index labels on the CPE, thus improving the success ratio of configuration FIG. 8 is a schematic flowchart of a method for reporting index label information according to the eighth embodiment of the present invention. In this embodiment, the mapping relationships between index labels and paths of object instances identified by instance labels stored on the CPE are as shown in Table 5. As shown in FIG. 8, the method in this embodiment may include the following steps:

Step 801: A managed device obtains a path of a deleted object instance identified by an instance label according to the object instance, where the instance label (instance number) is used by the managed device for citing an object instance.

Step 802: The managed device obtains the index label corresponding to the path of the deleted object instance, where the index label is used by a managing device for citing the object instance.

Step 803: The managed device sends a LabelDeletion Notification, where the Notification carries the index label of the deleted object instance.

In this embodiment, when a non-managing network entity (a user or a third-party entity) deletes an object instance of the managed device, the managed device can use an event to notify the managing device that the index label of the deleted object instance is deleted, so that the managing device can obtain information of the mapping relationship between the index label of the deleted object instance and the instance label on the managed device, thus improving the success ratio of configuration.

In this embodiment, a new LabelDeletion event is added to the event types; after the object instance including one or multiple index labels is deleted by a non-ACS entity (a user or a third-part entity), the CPE uses the event to notify the ACS that the index label is deleted. The definition of the LabelDeletion event may be as shown in Table 9:

TABLE 9

Definition of the LabelDeletion event

| Event Code | Accumulated Action | Description | Response from the ACS to Successful Delivery | Retry/Abandon Policy |
|---|---|---|---|---|
| "M LabelDeleted" | Multiple | Notifies the ACS that one or multiple index labels are deleted, where the cause of the event is that the object instance identified by the index label is deleted by a non-ACS entity | InformResponse | The CPE cannot abandon the undelivered "M LabelDeleted" event, unless a BOOTSTRAP event occurs. |

After an object instance including one or multiple index labels is deleted by a non-ACS entity, the CPE notifies the ACS of the deletion information by using the "M LabelDeleted" event. Further, the CPE needs to delete the path of the deleted object instance and the corresponding index label in the table of mapping relationships between index labels and paths of object instances identified by instance labels to update the table.

The CPE will add a message of the "M LabelDeleted" event in the event parameter of the Inform RPC method in the next established session. After receiving the message, the ACS can know index labels of which instance objects are deleted from the CPE.

In this embodiment, the CPE can use the "M LabelDeleted" event to notify the ACS that the object instance including one or multiple index labels is deleted by a non-ACS entity. For example, before the non-ACS entity deletes the object instance, the mapping relationships between index labels and paths of object instances identified by instance labels maintained on the CPE may be as shown in Table 10.

TABLE 10

Mapping relationship between index labels and paths of object instances identified by instance labels (before the object instance is deleted)

| Index Label | Path of the Object Instance |
|---|---|
| IPTV | InternetGatewayDevice.Services.1 |
| IPTV ChannelInfo | InternetGatewayDevice.Services.1.Info.3 |
| VoIP | InternetGatewayDevice.Services.5 |

An object instance is deleted by a user or a third-party entity, and the path of the object instance is "InternetGatewayDevice.Services.1". The CPE searches the table of mapping relationships between index labels and paths of object instances identified by instance labels according to information of the deleted object instance, namely, the path "InternetGatewayDevice.Services.1" of the deleted object instance, and finds the index label of the deleted object instance. The found index label includes:

index label "IPTV" corresponding to the path "InternetGatewayDevice.Services.1" of the object instance, and index label "IPTVChannelInfo" corresponding to the path "InternetGatewayDevice.Services.1.Info.3" of the object instance.

The CPE deletes paths of the two object instances and the corresponding index labels in the mapping relationship table. After the object instance is deleted, the mapping relationships between index labels and paths of object instances identified by instance labels updated on the CPE may be as shown in Table 11.

TABLE 11

Mapping relationship between index labels and paths of object instances identified by instance labels (after the object instance is deleted)

| Index Label | Path of the Object Instance |
|---|---|
| VoIP | InternetGatewayDevice.Services.5 |

The CPE establishes a connection with the ACS, and by adding an "M LabelDeleted" event to the Inform RPC method, notifies the ACS that the object instance including the index labels "IPTV" and "IPTVChannelInfo" is deleted by a non-ACS entity. In this way, the ACS knows that an index label is deleted because its corresponding object instance is deleted by a non-ACS entity.

After the ACS obtains the index label of the deleted object instance on the CPE by using the method for reporting index information in this embodiment, the ACS knows that the object instance corresponding to the index label is deleted, so that the ACS will not configure the deleted object instance any longer, thus improving the success ratio of configuration.

Figure 9:
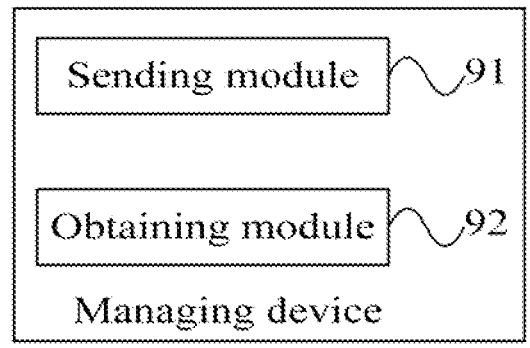
FIG. 9 is a schematic structural diagram of a managing device according to a ninth embodiment of the present invention.

FIG. 9 is a schematic structural diagram of a managing device according to the ninth embodiment of the present invention. As shown in FIG. 9, the managing device in this embodiment may include a sending module 91 and an obtaining module 92. The sending module 91 sends a SearchLabel Request, where the Request carries information of an index label under search and the index label is used by the managing device for citing an object instance; the obtaining module 92 receives a SearchLabel Response returned according to the SearchLabel Request, where the Response carries information of an instance label corresponding to the index label information and the instance label (instance number) is used by the managed device for citing the object instance.

The managing device in this embodiment can be regarded as an ACS. In this embodiment, the sending module and the obtaining module can call the SearchLabel RPC method to search the managed device for the mapping relationships between index labels and instance labels, so that the obtaining module can obtain information of the mapping relationships between index labels and instance labels on the managed device, thus improving the success ratio of configuration.

Figure 10:
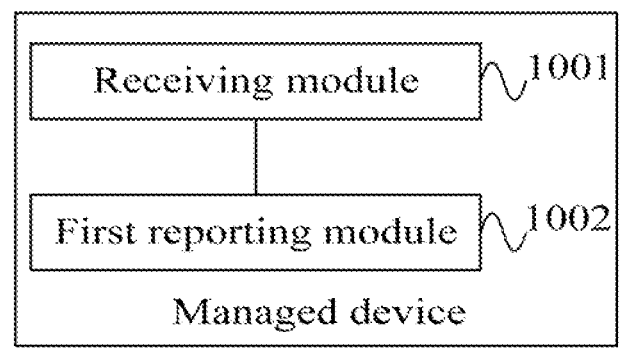
FIG. 10 is a schematic structural diagram of a managed device according to a tenth embodiment of the present invention.

FIG. 10 is a schematic structural diagram of a managed device according to the tenth embodiment of the present invention. As shown in FIG. 10, the managed device in this embodiment may include a receiving module 1001 and a first reporting module 1002. The receiving module 1001 receives a SearchLabel Request, where the Request carries information of an index label under search and the index label is used by a managing device for citing an object instance. The first reporting module 1002 sends a SearchLabel Response, where the Response carries information of an instance label corresponding to the index label information and the instance label (instance number) is used by the managed object for citing the object instance.

Figure 11:
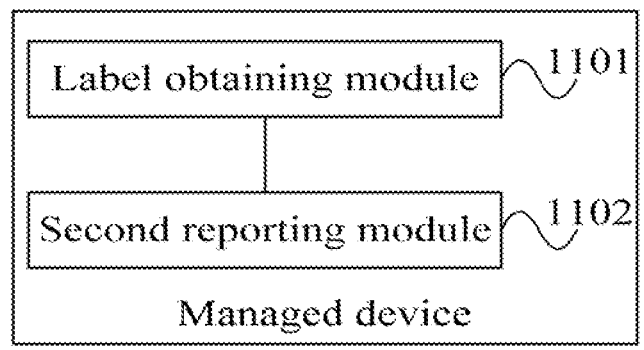
FIG. 11 is a schematic structural diagram of another managed device according to an eleventh embodiment of the present invention.

The managed device in this embodiment can be regarded as a CPE. In this embodiment, the managed device pre-stores the mapping relationships between index labels and instance labels. When the managing device calls the SearchLabel RPC method to perform search, the first reporting module returns information of mapping relationships between index labels and instance labels to the managing device, thus improving the success ratio of configuration FIG. 11 is a schematic structural diagram of another managed device according to the eleventh embodiment of the present invention. As shown in FIG. 11, the managed device in this embodiment may include a label obtaining module 1101 and a second reporting module 1102. The label obtaining module 1101 obtains a path of a deleted object instance identified by an instance label according to the object instance, where the instance label (instance number) is used by the managed device for citing an object instance, and obtains an index label corresponding to the path of the deleted object instance, where the index label is used by a managing device for citing the object instance. The second reporting module 1102 sends a LabelDeletion Notification, where the Notification carries the index label of the deleted object instance.

The managed device in this embodiment can be regarded as a CPE. In this embodiment, when a non-managing network entity (a user or a third-party entity) deletes an object instance of the managed device, the second reporting module can use an event to notify the managing device that the index label of the deleted object instance is deleted, so that the managing device can obtain information of the mapping relationship between the index label of the deleted object instance and the instance label on the managed device, and know that the object instance corresponding to the index label is deleted. Therefore, the managing device will not configure the deleted object instance any longer, thus improving the success ratio of configuration.

Figure 12:
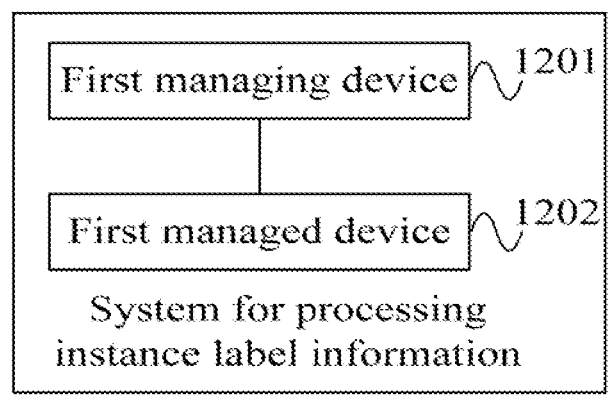
FIG. 12 is a schematic structural diagram of a system for processing instance label information according to a twelfth embodiment of the present invention.

FIG. 12 is a schematic structural diagram of a system for processing instance label information according to the twelfth embodiment of the present invention. As shown in FIG. 12, the system in this embodiment includes a first managing device 1201 and a first managed device 1202.

The first managing device 1201 is configured to: send a SearchLabel Request to the first managed device 1202, where the Request carries information of an index label under search and the index label is used by the first managing device 1201 for citing an object instance, and receive a SearchLabel Response returned by the first managed device 1202, where the Response carries information of an instance label corresponding to the index label information under search and the instance label (instance number) is used by the first managed device 1202 for citing the object instance.

The first managed device 1202 is configured to receive the SearchLabel Request sent by the first managing device 1201 and send the SearchLabel Response to the first managing device 1201 according to the SearchLabel Request.

Figure 13:
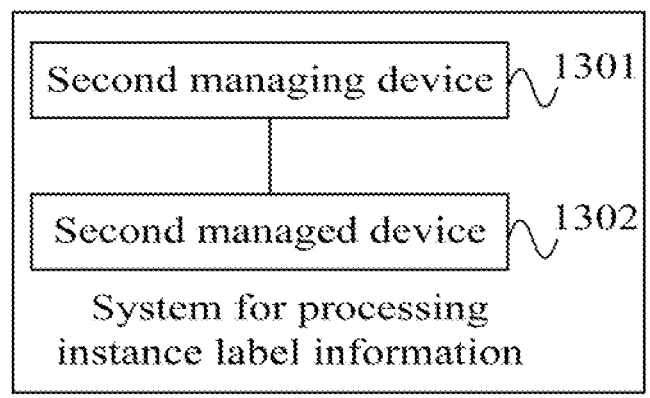
FIG. 13 is a schematic structural diagram of a system for processing index label information according to a thirteenth embodiment of the present invention.

In the system of this embodiment, the first managing device may be regarded as an ACS and the first managed device may be regarded as a CPE. In this embodiment, the first managing device can call the SearchLabel RPC method to search the first managed device for the mapping relationships between index labels and instance labels; the first managed device can find the corresponding instance labels according to the obtained index labels, and return information of the mapping relationships between the index labels and the instance labels, so that the first managing device can obtain information of the mapping relationships of the index labels on the first managed device, thus improving the success ratio of configuration FIG. 13 is a schematic structural diagram of a system for processing index label information according to the thirteenth embodiment of the present invention. As shown in FIG. 13, the system in this embodiment includes a second managing device 1301 and a second managed device 1302.

The second managed device 1302 is configured to send a LabelDeletion Notification to the second managing device 1301, where the Notification carries an index label corresponding to a deleted object instance and the index label is used by the second managing device 1301 for citing an object instance.

The second managing device 1301 is configured to receive the LabelDeletion Notification sent by the second managed device 1302.

In the system of this embodiment, the second managing device may be regarded as an ACS and the second managed device may be regarded as a CPE. In this embodiment, when a non-managing network entity (a user or a third-party entity) deletes an object instance of the managed device, the second managed device can use an event to notify the second managing device that the index label of the deleted object instance is deleted, so that the second managing device can obtain information of the mapping relationship between the index label of the deleted object instance and the instance label on the second managed device and know that the object instance corresponding to the index label is deleted. Therefore, the second managing device will not configure the deleted object instance any longer, thus improving the success ratio of configuration.

It is understandable to those skilled in the art that all steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a read only memory (ROM), a random access memory (RAM), a magnetic disk, or a compact disk-read only memory (CD-ROM).

The objectives, technical solution and benefits of the embodiments of the present invention have been described in detail. Although the invention has been described through some exemplary embodiments, the invention is not limited to such embodiments. Any modification, replacement, or improvement to the invention without departing from the spirit and scope of the invention shall fall within the scope of protection defined by the following claims or their equivalents.

What is claimed is:

1. A method for obtaining information of an instance label, comprising:

sending, by a managing device, a SearchLabel Request, wherein the SearchLabel Request carries information of an index label and the index label is used by the managing device for citing an object instance; and receiving, by the managing device, a SearchLabel Response, wherein the SearchLabel Response carries the information of the instance label corresponding to the information of the index label and the instance label is configured to cite the object instance by a managed device, wherein the information of the instance label comprises a path of the object instance, and wherein the path comprises the instance label, and wherein: the SearchLabel Response comprises a first parameter and a second parameter, the first parameter indicates whether the index label exists in the managed device, the second parameter comprises a structure array and indicates mappings between index labels and instance labels, the managed device is configured to send a Label Deletion event to the managing device, and the Label Deletion event indicates that one or more object instances and/or index labels is deleted from the managed device.

2. The method according to claim 1, wherein: the index label is generated by the managing device, the instance label is generated by the managed device, and one index label corresponds to one or multiple instance labels.

3. The method according to claim 2, wherein the SearchLabel Response further carries the index label corresponding to the object instance.

4. The method according to claim 2, wherein the instance label comprises an instance number.

5. The method according to claim 1, wherein: the information of the index label comprises a specified index label, and the information of the instance label corresponding to the information of the index label comprises information of an instance label corresponding to the specified index label.

6. The method according to claim 5, wherein the SearchLabel Response further carries the index label corresponding to the object instance.

7. The method according to claim 5, wherein the instance label comprises an instance number.

8. The method according to claim 1, wherein: the information of the index label comprises a partial path, and the information of the instance label corresponding to the information of the index label comprises information of instance labels corresponding to all index labels in the path on the managed device.

9. The method according to claim 8, wherein the SearchLabel Response further carries the index label corresponding to the object instance.

10. The method according to claim 8, wherein the instance label comprises an instance number.

11. The method according to claim 1, wherein: the information of the index label comprises the index label information is a null string, and the information of the instance label corresponding to the information of the index label comprises information of instance labels corresponding to all index labels on the managed device.

12. The method according to claim 11, wherein the SearchLabel Response further carries the index label corresponding to the object instance.

13. The method according to claim 11, wherein the instance label comprises an instance number.

14. The method according to claim 1, wherein the SearchLabel Response further carries the index label corresponding to the object instance.

15. The method according to claim 1, wherein the instance label comprises an instance number.

16. A method for reporting information of an instance label, comprising:

receiving, by a managed device, a SearchLabel Request, wherein the SearchLabel Request carries information of an index label and the index label is configured to cite an object instance by a managing device; and sending, by the managed device, a SearchLabel Response, wherein the SearchLabel Response carries the information of the instance label corresponding to the information of the index label and the instance label is used by the managed device for citing the object instance, wherein the information of the instance label comprises a path of the object instance, and wherein the path comprises the instance label, and wherein: the SearchLabel Response comprises a first parameter and a second parameter, the first parameter indicates whether the index label exists in the managed device, the second parameter comprises a structure array and indicates mappings between index labels and instance labels, the managed device is configured to send a Label Deletion event to the managing device, and the Label Deletion event indicates that one or more object instances and/or index labels is deleted from the managed device.

17. The method according to claim 16, wherein: the index label is generated by the managing device, the instance label is generated by the managed device, and one index label corresponds to one or multiple instance labels.

18. The method according to claim 17, wherein the SearchLabel Response further carries the index label corresponding to the object instance.

19. The method according to claim 17, wherein the instance label comprises an instance number.

20. The method according to claim 16, wherein: the information of the index label comprises a specified index label, and the information of the instance label corresponding to the information of the index label comprises information of an instance label corresponding to the specified index label.

21. The method according to claim 20, wherein the SearchLabel Response further carries the index label corresponding to the object instance.

22. The method according to claim 20, wherein the instance label comprises an instance number.

23. The method according to claim 16, wherein: the information of the index label comprises a partial path, and the information of the instance label corresponding to the information of the index label comprises information of instance labels corresponding to all index labels in the path on the managed device.

24. The method according to claim 23, wherein the SearchLabel Response further carries the index label corresponding to the object instance.

25. The method according to claim 23, wherein the instance label comprises an instance number.

26. The method according to claim 16, wherein: the information of the index label comprises a null string, and the information of the instance label corresponding to the information of the index label comprises information of instance labels corresponding to all index labels on the managed device.

27. The method according to claim 26, wherein the SearchLabel Response further carries the index label corresponding to the object instance.

28. The method according to claim 26, wherein the instance label comprises an instance number.

29. The method according to claim 16, wherein the SearchLabel Response further carries the index label corresponding to the object instance.

30. The method according to claim 16, wherein the instance label comprises an instance number.

31. A managing device, comprising:
    a sending module configured to send a SearchLabel Request, wherein the SearchLabel Request carries information of an index label and the index label is used by the managing device for citing an object instance; and
    an obtaining module configured to receive a SearchLabel Response, wherein the SearchLabel Response carries information of an instance label corresponding to the information of the index label and the instance label is configured to cite the object instance by a managed device, wherein the information of the instance label comprises a path of the object instance, and wherein the path comprises the instance label, and
    wherein: the SearchLabel Response comprises a first parameter and a second parameter, the first parameter indicates whether the index label exists in the managed device, the second parameter comprises a structure array and indicates mappings between index labels and instance labels, the managed device is configured to send a Label Deletion event to the managing device, and the Label Deletion event indicates that one or more object instances and/or index labels is deleted from the managed device.

32. A managed device, comprising:
    a receiving module configured to receive a SearchLabel Request, wherein the SearchLabel Request carries information of an index label and the index label is configured to cite an object instance by a managing device; and
    a first reporting module configured to send a SearchLabel Response, wherein the SearchLabel Response carries information of an instance label corresponding to the information of the index label and the instance label is used by the managed device for citing the object instance, wherein the information of the instance label comprises a path of the object instance, and wherein the path comprises the instance label, and
    wherein: the SearchLabel Response comprises a first parameter and a second parameter, the first parameter indicates whether the index label exists in the managed device, the second parameter comprises a structure array and indicates mappings between index labels and instance labels, the managed device is configured to send a Label Deletion event to the managing device, and the Label Deletion event indicates that one or more object instances and/or index labels is deleted from the managed device.

33. A system for processing information of an instance label, comprising:
    a managing device; and
    a managed device communicatively coupled to the managing device,
    wherein the managing device is configured to:
        send a SearchLabel Request to the managed device, wherein the SearchLabel Request carries information of an index label and the index label is used by the managing device for citing an object instance; and
        receive a SearchLabel Response, wherein the SearchLabel Response carries the information of the instance label corresponding to the information of the index label and the instance label is used by the managed device for citing the object instance, wherein the information of the instance label comprises a path of the object instance, and wherein the path comprises the instance label,
    wherein the managed device is configured to receive the SearchLabel Request sent by the managing device and send the SearchLabel Response to the managing device, and wherein: the SearchLabel Response comprises a first parameter and a second parameter, the first parameter indicates whether the index label exists in the managed device, the second parameter comprises a structure array and indicates mappings between index labels and instance labels, the managed device is configured to send a Label Deletion event to the managing device, and the Label Deletion event indicates that one or more object instances and/or index labels is deleted from the managed device.

* * * * *

UNITED STATES PATENT AND TRADEMARK OFFICE
CERTIFICATE OF CORRECTION

| | | |
|---|---|---|
| PATENT NO. | : 8,661,134 B2 | Page 1 of 1 |
| APPLICATION NO. | : 13/161915 | |
| DATED | : February 25, 2014 | |
| INVENTOR(S) | : Wu et al. | |

It is certified that error appears in the above-identified patent and that said Letters Patent is hereby corrected as shown below:

In the Claims

Col. 21 Line 52, Claim 11 should read:

The method according to claim 1, wherein: the information of the index label comprises a null string, and the information of the instance label corresponding to the information of the index label comprises information of instance labels corresponding to all index labels on the managed device.

Signed and Sealed this
Thirteenth Day of May, 2014

Michelle K. Lee
*Deputy Director of the United States Patent and Trademark Office*